(12) United States Patent
Kretschmann et al.

(10) Patent No.: US 11,458,782 B2
(45) Date of Patent: Oct. 4, 2022

(54) METHOD AND DEVICE FOR MONITORING A BEHAVIOR OF A TIRE OF A VEHICLE

(71) Applicant: Continental Automotive GmbH, Hannover (DE)

(72) Inventors: Matthias Kretschmann, Wenzenbach (DE); Nicolas Guinart, Toulouse (FR); Nikita Trushkin, Toulouse (FR)

(73) Assignee: Continental Automotive GmbH

( * ) Notice: Subject to any disclaimer, the term of this patent is extended or adjusted under 35 U.S.C. 154(b) by 359 days.

(21) Appl. No.: 16/634,037

(22) PCT Filed: Jul. 20, 2018

(86) PCT No.: PCT/EP2018/069846
§ 371 (c)(1),
(2) Date: Jan. 24, 2020

(87) PCT Pub. No.: WO2019/020536
PCT Pub. Date: Jan. 31, 2019

(65) Prior Publication Data
US 2021/0086569 A1    Mar. 25, 2021

(30) Foreign Application Priority Data

Jul. 27, 2017 (GB) .................................... 1712123

(51) Int. Cl.
*G01M 17/02* (2006.01)
*B60C 23/04* (2006.01)
(Continued)

(52) U.S. Cl.
CPC ........ *B60C 23/0488* (2013.01); *B60T 8/1725* (2013.01); *B60C 23/064* (2013.01);
(Continued)

(58) Field of Classification Search
CPC . B60T 2240/03; B60T 2240/04; G01M 17/02
See application file for complete search history.

(56) References Cited

U.S. PATENT DOCUMENTS

| | | | |
|---|---|---|---|
| 5,481,455 A | 1/1996 | Iwata et al. | |
| 5,723,768 A | 3/1998 | Ammon | |

(Continued)

FOREIGN PATENT DOCUMENTS

| | | | |
|---|---|---|---|
| CN | 1625500 A | 6/2005 | |
| CN | 1878691 A | 12/2006 | |

(Continued)

OTHER PUBLICATIONS

International Search Report and Written Opinion dated Sep. 25, 2018 from corresponding International Patent Application No. PCT/EP2018/069846.

(Continued)

*Primary Examiner* — Eric S. McCall

(57) ABSTRACT

The disclosure relates to a method for monitoring behavior of a tire of a vehicle in a rolling condition of the tire, comprising the steps of: acquiring a signal representative of an acceleration of a specified point of the tire, deriving from the signal a curve which represents a profile of the acceleration of the point during a revolution of the tire, determining a leading portion and a trailing portion of the curve, corresponding to an entry of the point into a footprint region of the tire and corresponding to an exit of the point from the footprint region of the tire, respectively, determining a first measure of a volatility of the signal in the leading portion and a second measure of a volatility of the signal in the trailing portion, and determining an indication of the behavior of the tire based on the first measure and the second measure.

15 Claims, 3 Drawing Sheets

Figure 1:
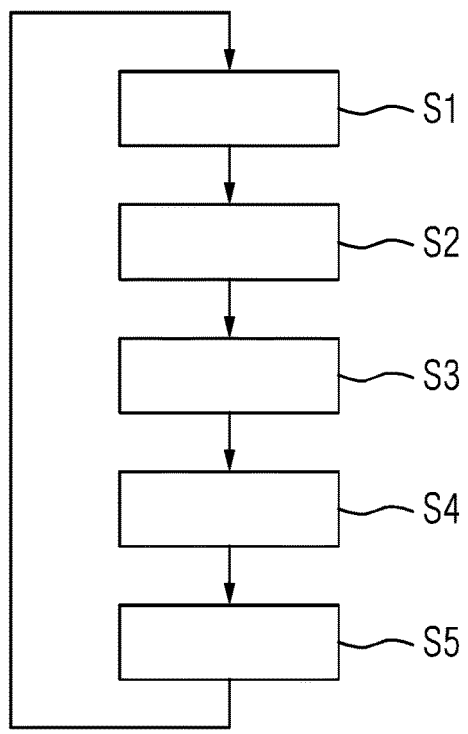

(51) Int. Cl.
*B60T 8/172* (2006.01)
*B60C 23/06* (2006.01)

(52) U.S. Cl.
CPC ....... *B60T 2210/13* (2013.01); *B60T 2240/03* (2013.01); *B60T 2240/04* (2013.01)

(56) References Cited

U.S. PATENT DOCUMENTS

| | | | |
|---|---|---|---|
| 2007/0213953 A1* | 9/2007 | Kitazaki | G01B 21/32 73/146 |
| 2007/0255510 A1 | 11/2007 | Mancosu et al. | |
| 2010/0324858 A1* | 12/2010 | Pannek | B60C 23/0488 73/146 |
| 2011/0199201 A1 | 8/2011 | Brusarosco et al. | |
| 2015/0210286 A1 | 7/2015 | Hanatsuka et al. | |
| 2017/0259627 A1* | 9/2017 | Araya | B60T 8/171 |
| 2019/0001757 A1* | 1/2019 | Singh | B60C 23/0408 |
| 2019/0070910 A1* | 3/2019 | Guinart | G01P 15/08 |
| 2020/0231010 A1* | 7/2020 | Carpenter | B60C 11/243 |
| 2020/0353778 A1* | 11/2020 | Rocca | B60T 8/1725 |
| 2021/0101415 A1* | 4/2021 | Kim | B60C 11/243 |
| 2021/0101416 A1* | 4/2021 | Kim | G01P 15/00 |
| 2021/0188017 A1* | 6/2021 | Ciaravola | B60C 11/246 |
| 2021/0260937 A1* | 8/2021 | Cyllik | B60C 23/0489 |
| 2021/0300133 A1* | 9/2021 | Tang | B60C 11/243 |
| 2021/0309058 A1* | 10/2021 | Guinart | G01P 15/09 |
| 2022/0080789 A1* | 3/2022 | Alff | B60C 23/061 |
| 2022/0080790 A1* | 3/2022 | Alff | B60C 11/246 |

FOREIGN PATENT DOCUMENTS

| | | |
|---|---|---|
| CN | 102196952 A | 9/2011 |
| CN | 104540717 A | 4/2015 |
| DE | 4242726 A1 | 6/1994 |
| DE | 20301710 U1 | 7/2003 |
| DE | 102004051653 A1 | 4/2006 |
| EP | 2537723 A2 | 12/2012 |
| JP | 2007055284 A | 3/2007 |
| WO | 2005/042322 A1 | 5/2005 |
| WO | 2010/046871 A1 | 4/2010 |
| WO | 2012/085655 A2 | 6/2012 |
| WO | 2013/179159 A1 | 12/2013 |
| WO | 2015/073015 A1 | 5/2015 |

OTHER PUBLICATIONS

Search and Examination Report dated Jan. 18, 2018 for corresponding GB Patent Application No. GB 1712123.7.
Search Report dated Jul. 4, 2022 from corresponding Chinese patent application No. 201880047263.4.
First Office Action dated Jul. 12, 2022 from corresponding Chinese patent application No. 201880047263.4.
First Office Action dated Jul. 12, 2022 (translated) from corresponding Chinese patent application No. 201880047263.4.

* cited by examiner

METHOD AND DEVICE FOR MONITORING A BEHAVIOR OF A TIRE OF A VEHICLE

The present invention relates to a method and a device for monitoring a behavior of a tire of a vehicle in a rolling condition of the tire.

The document DE 42 42 726 A1 discloses a method and a system for aquaplaning detection for a tire of a vehicle, wherein a deformation of profile elements of the tire is detected in the circumferential direction during passage through a footprint region of the tire, and a thus obtained signal representative of the deformation is compared with a predetermined signal profile derived from previously achieved measurement results on a dry road.

The document EP 1 487 681 B1 discloses a method and a system for monitoring the instantaneous behavior of a tire of a vehicle in a rolling condition of the tire, which also allows e.g. aquaplaning detection. A reference curve which represents the acceleration profile of a specified point of the tire as a function of the position of the point in a revolution of the tire is acquired and stored in advance. Then a signal representative of the acceleration of the specified point of a tire is continuously acquired, a cyclic curve representing an actual acceleration profile is then derived from the signal, and the derived cyclic curve is compared with the reference curve. Depending on the result of the comparison, a signal indicating the instantaneous behavior of the tire (e.g. aquaplaning behavior) is emitted.

A disadvantage of the above mentioned systems is the necessary effort for acquiring suitable reference curves corresponding to a "normal" behavior of the tire. Furthermore, a crucial point in practice is that such "normal" behavior of a tire and thus a "reference curve" (of the signal) for a particular tire is subject to changes during the lifetime of the tire, e.g. due to changes of the mechanical properties of the tire material and/or the decrease of the tread depth of the tire. Therefore, a definition of criteria of signal analysis or definition of a reference curve, respectively, which is suitable for a new tire may become false or inaccurate during the lifetime of the tire.

It is an object of the present invention to provide a method and a device for monitoring a behavior of a tire of a vehicle in a rolling condition of the tire which may avoid the disadvantages mentioned above.

According to a first aspect of the invention, a method for monitoring a behavior of a tire of a vehicle in a rolling condition of the tire is provided, wherein the method comprises the steps of:
  a) acquiring a signal representative of an acceleration of a specified point of the tire,
  b) deriving from the signal a curve which represents a profile of the acceleration of the point during a revolution of the tire,
  c) determining a leading portion and a trailing portion of the curve, corresponding to an entry of the point into a footprint region of the tire and corresponding to an exit of the point from the footprint region of the tire, respectively,
  d) determining a first measure of a volatility of the signal in the leading portion and a second measure of a volatility of the signal in the trailing portion,
  e) determining an indication of the behavior of the tire based on the first measure and the second measure.

Advantageously, with the invention it is possible to determine an indication of the behavior of the tire without the need of acquiring and storing a reference curve. Rather, the invention relies on an evaluation of the acquired signal representative of the acceleration of the specified point of the tire, as described above.

In an embodiment, the step e) comprises determining an aquaplaning condition of the tire based on the first measure and the second measure as will be explained in more detail in the following.

In an embodiment, step a) is realized by means of an electronic tire unit which is arranged at the tire (e.g. at an inner side of a tire running surface).

In this case, the electronic tire unit may comprise an acceleration sensor for providing the signal representative of the acceleration, wherein the specified point of the tire is defined by the position of the electronic tire unit at the tire.

In an embodiment, the signal acquired in step a) is representative of the radial acceleration. Alternatively, e.g. the tangential acceleration may be used in step a).

In particular, when step a) is realized by means of an electronic tire unit, also step b) may be realized by means of said electronic tire unit.

In this case, the electronic tire unit may comprise a computing device for deriving the curve e.g. by means of performing calculations on a digital representation of the acquired signal (e.g. time-resolved or e.g. rotation angle-resolved acceleration data).

In an embodiment of step b), the curve is derived by means of a smoothing of the signal acquired in step a).

Such a smoothing may be implemented e.g. by calculating a moving average of the acquired signal values and/or by a regression analysis on the acquired signal values (for fitting the curve based on a mathematical model thereof).

In particular, when step b) is realized by means of an electronic tire unit, also step c) may be realized by means of the electronic tire unit.

In this case, the electronic tire unit may comprise a computing device performing calculations on a digital representation of the curve for determining the leading portion and the trailing portion of the curve. Each of these portions may be defined e.g. by respective start and end points in the course of time (when the curve is defined by time-dependent signal values) or in the course of an angle (when the curve is defined by signal values depending on a rotation angle of the tire).

In an embodiment, the leading portion and the trailing portion of the curve each are determined by using a detection of edges in the curve.

In an embodiment of step c), a start point of the leading portion is determined as a predetermined point within a rise of the curve up to a first maximum of the curve (associated with an entry into the footprint of the tire). For example, this point may be chosen in a middle portion of said rise. Alternatively, this point may be chosen as e.g. the position of the first maximum itself (where the rise ends). In another alternative, this point may be determined as a predetermined point (e.g. approximately in the middle) within a fall of the curve ranging from the first maximum to a subsequent minimum in the curve (associated with the footprint of the tire).

In an embodiment, an end point of the leading portion is determined as a predetermined point within the fall of the curve directly following the first maximum. For example, this point may be chosen in a middle portion of this fall. Alternatively, this point may be chosen as e.g. a position within the minimum of the curve (associated with the footprint), e.g. at a center of this minimum (associated with a center of the footprint).

In an embodiment, a start point of the trailing portion is determined as a predetermined point within a rise of the curve following the minimum of the curve (associated with the center of the footprint) up to a second maximum. For example, this point may be chosen in a middle portion of this rise. Alternatively, this point may be chosen as e.g. a position within the minimum of the curve (associated with the footprint), e.g. at a center of this minimum (associated with the center of the footprint).

In an embodiment, an end point of the trailing portion is determined as a predetermined point within a fall of the curve following the second maximum of the curve. For example, this point may be chosen in a middle portion of said fall. Alternatively, this point may be chosen e.g. as the position of the second maximum itself (where the fall begins). In another alternative, this point may be determined as a predetermined point (e.g. approximately in the middle) within a rise of the curve ranging from the minimum of the curve (associated with the footprint) up to the second maximum.

In particular, when step c) is realized by means of an electronic tire unit also step d) may be realized by means of the electronic tire unit.

In an embodiment of step d), the first measure and the second measure each are determined based on an evaluation of RMS ("root means square") noise of the signal.

Alternatively or in addition, each of the first measure and the second measure may also be determined e.g. based on an evaluation of a change of a gradient in the course of the signal.

In another embodiment of step d), the first measure and the second measure each are determined based on the result of a counting how often the signal falls below a predetermined threshold and/or how often exceeds a predetermined threshold (e.g. the same threshold) in the respective portion (i.e. leading portion or trailing portion, respectively).

The determining in step d) may be implemented by a computing device of the electronic tire unit.

In particular, when step d) is realized by means of an electronic tire unit, also step e) may be realized by means of the electronic tire unit.

In an embodiment of step e), determining the indication of the behavior of the tire comprises determining a difference between the first measure and the second measure. In this case, the first measure and the second measure determined in step d) each for example may be volatility values, and the determination of the difference in step e) in this case may be implemented as a mathematical subtraction of the first volatility value from the second volatility value (or vice versa).

In an embodiment of step e), determining the indication of the behavior of the tire comprises determining a total amount of the first measure and the second measure. In this case, the first measure and the second measure each for example may be volatility values, and the determination of the total amount in step e) in this case may be implemented as a mathematical (weighted or unweighted) addition of the first volatility value and the second volatility value.

In an embodiment, step e) comprises classifying each of the first measure and the second measure in terms of the respective amounts (e.g. resulting in a classification as "low", "medium", "high"), and determining the indication of the behavior based on the result of the classification.

In this case, for example, if the first measure as well as the second measure are "low", step e) may output an indication "normal behavior on dry road". However, if the first measure is "high" and the second measure is "low", step e) may output an indication "danger of beginning aquaplaning". If the first measure as well as the second measure are "high", this may be interpreted as an indication of an "off road behavior". In general, such indications may be e.g. retrieved from a look-up table, based on the results of a previously conducted classification of the first and second measures.

In an embodiment, the method further comprises a step of outputting a warning if the determined behavior of the tire fulfils a predetermined warning criterion.

In an embodiment, if step e) comprises determining a difference between the first measure and the second measure, the warning criterion is fulfilled if this difference determined in step e) exceeds a predetermined threshold.

The invention may be advantageously used e.g. for outputting an aquaplaning warning. Advantageously, in this way it is possible to detect a danger of aquaplaning (which is also referred to as hydroplaning) before it actually takes place (and the grip of the tire is lost). Mainly in this situation there is a relatively great difference (asymmetry) between a leading side and a trailing side of the tire's footprint. At the leading side, a film or "wedge" of water forms between the tire and the ground (e.g. a road surface), whereas at the trailing side fewer water is present between the tire and the ground. In contrast, when aquaplaning already takes place, water is more evenly distributed in the area of the footprint. In this situation, the difference determined in step e) will be decreased in comparison with the case of the situation just before the start of aquaplaning.

The warning may be output to a driver of the vehicle, e.g. as an optical signal and/or an acoustic signal.

Alternatively or in addition, the warning may be output to at least one electronic system of the vehicle, e.g. an anti-lock braking system (ABS) or an electronic stability program (ESP). Alternatively or in addition to outputting a warning, an information representing the behavior determined in step e) may be output to the at least one electronic system of the vehicle, which then may e.g. evaluate the received information (e.g. data), e.g. for generating a warning.

In all embodiments described herein and involving a warning, alternatively a message instead of a warning (in the strict sense of the term) may be foreseen, wherein such message contains the respective information about the behavior of the tire.

Further, the invention may be advantageously used e.g. for outputting an indication related to the condition of the ground on which the tire rolls or the respective vehicle is driving, respectively. For example, the invention may be used for detecting an offroad condition, or e.g. for detecting different types of roads (e.g. "dry road", "wet road", "dirty road", "soft ground", "cobble stone pavement" etc.), i.e. the step e) may comprise determining a type of a road the vehicle is currently driving on.

According to a further aspect of the present invention, a device for monitoring a behavior of a tire of a vehicle in a rolling condition of the tire is provided, wherein the device comprises:

acquiring means for acquiring a signal representative of an acceleration of a specified point of the tire, deriving means for deriving from the signal a curve which represents a profile of the acceleration of the point during a revolution of the tire, first determining means for determining a leading portion and a trailing portion of the curve, corresponding to an entry of the point into a footprint region of the tire and corresponding to an exit of the point from the footprint region of the tire, respectively, second determining means for determining a first measure of a volatility of the signal in the leading portion and a second measure of a volatility of the signal in the trailing portion, third determining means for determining an indication of the behavior of the tire based on the first measure and the second measure.

The embodiments and specific details described for the methods according to the embodiments of the invention can be provided in a corresponding manner individually or in any combination, as embodiments or specific details of the device according to the further aspect of the invention.

In this respect, in an embodiment, the acquiring means are provided by an acceleration sensor of an electronic tire unit arranged at (e.g. in) a respective tire of a vehicle.

In a further embodiment, the acceleration sensor provides a signal representative of the radial acceleration of the point at which the acceleration sensor is arranged. Alternatively, a tangentially oriented acceleration sensor or e.g. a shocksensor may also be used for acquiring the signal.

In an embodiment, the deriving means and the first, second and third determining means are provided by a computing device, for example a computing device of the electronic tire unit or a computing device of an electronic control unit of the vehicle.

The computing device is preferably formed by a program-controlled device as e.g. a microcontroller, which includes or which is connected to a storing unit for storing software for operating the computing device.

In this respect, the software may define algorithms for conducting steps b) to e) of the monitoring method according to the first aspect of the invention.

The electronic tire unit preferably comprises an RF (radio frequency) transmitter for sending RF signals including information about the indication of the behavior of the tire determined by the electronic tire unit to an RF receiver installed at the vehicle.

The RF receiver may be used to receive RF signals from a plurality of electronic tire units arranged at different tires of the same vehicle.

The RF receiver may be coupled to an electronic control unit (ECU) of the vehicle (e.g. connected via a digital data bus system), so that the electronic control unit may e.g. generate a warning (e.g. an aquaplaning warning) for a driver of the vehicle and/or for particular electronic systems of the vehicle. Thus, the device for monitoring the behavior of the tire may further comprise outputting means for outputting a warning if the determined behavior of the tire fulfils a predetermined warning criterion.

If the electronic control unit receives indications of the behavior of a plurality of tires, the output of a warning or message, respectively, may depend on the result of an evaluation of the received information as a whole (taking into account more than one tire of the vehicle).

The third determining means may further be configured for determining a type of a road the vehicle is currently driving on.

According to another aspect of the present invention, a computer program product comprising software code for performing the monitoring method described above is provided.

Such software code may be used for controlling the operation of the above mentioned computing device of the electronic tire unit and/or for controlling the operation of the above mentioned electronic control unit of the vehicle.

Figure 2:
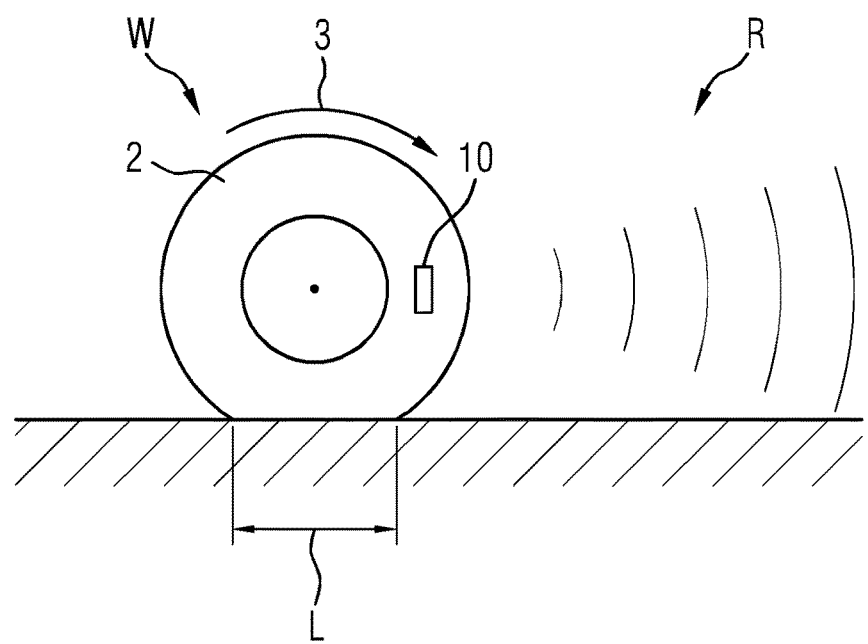
Figure 3:
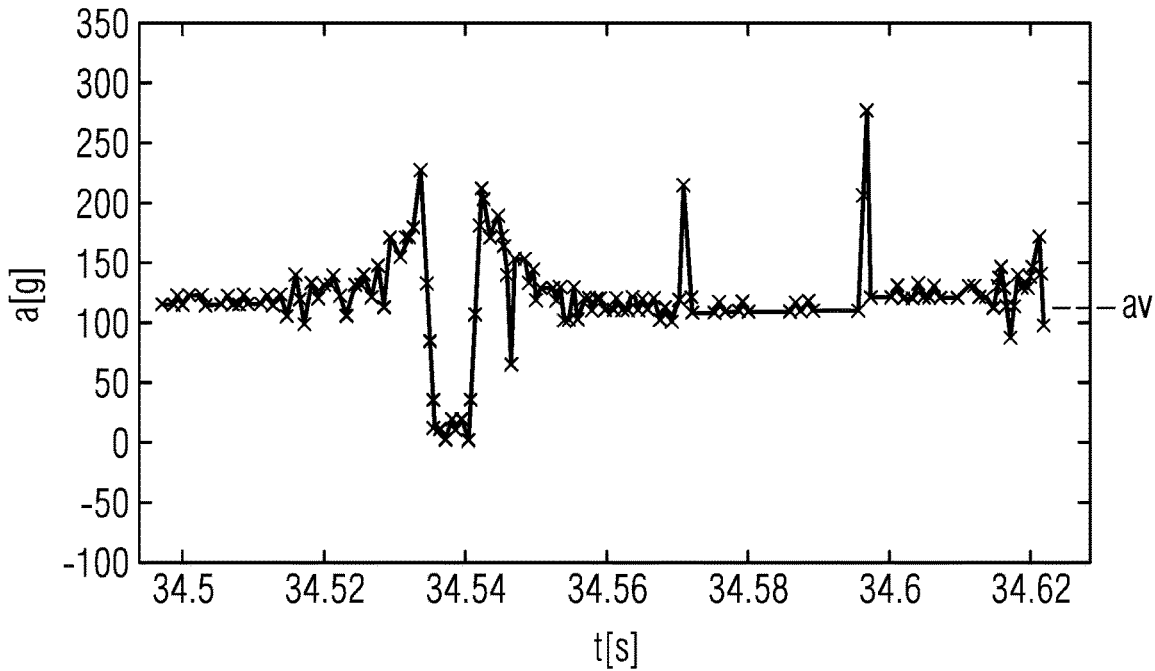
Figure 4:
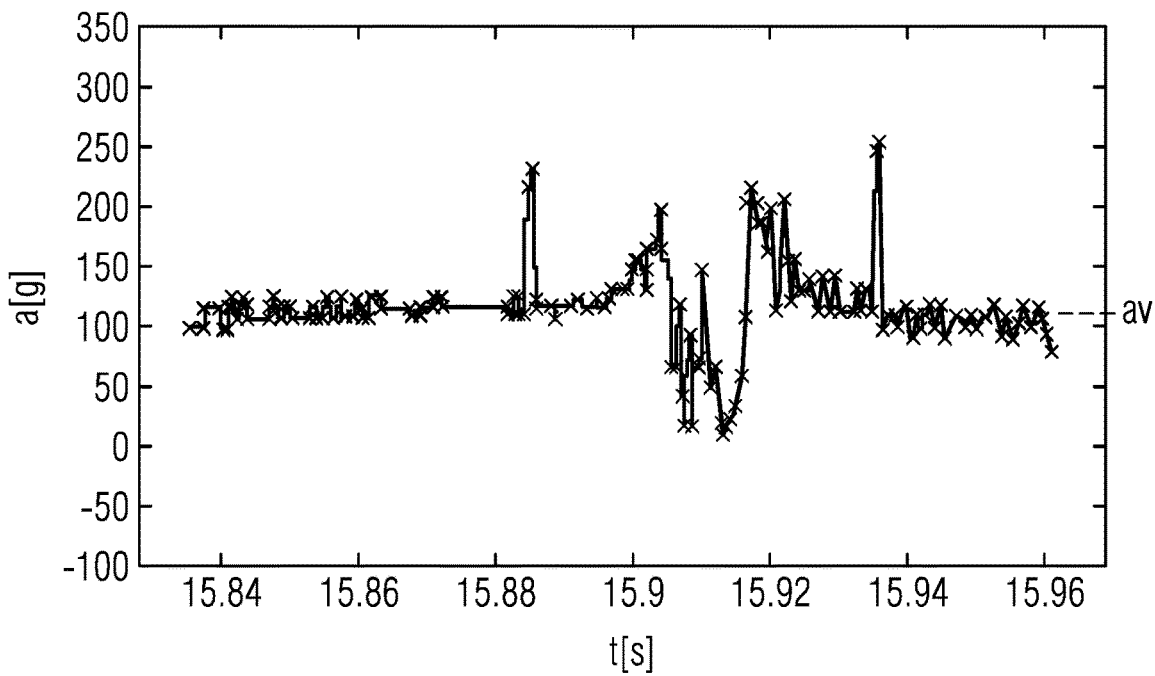
Figure 5:
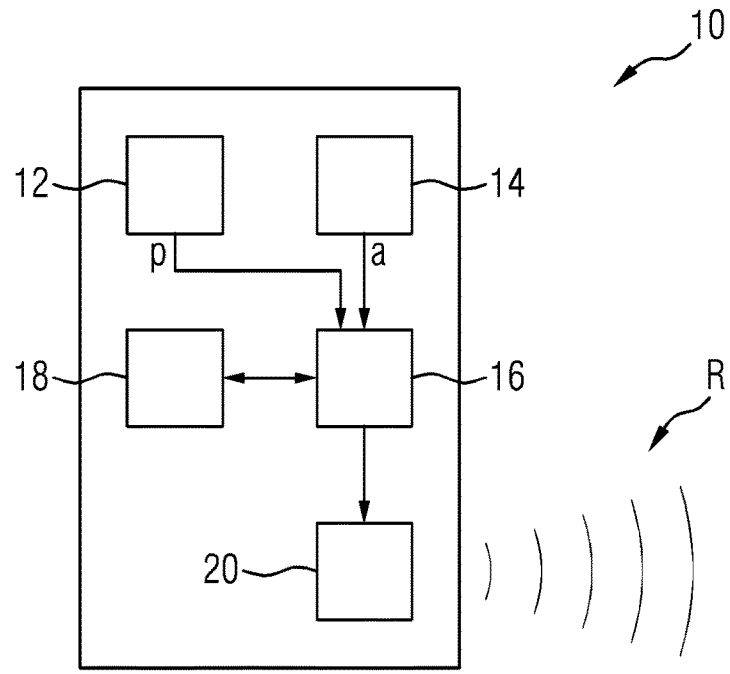
Figure 6:
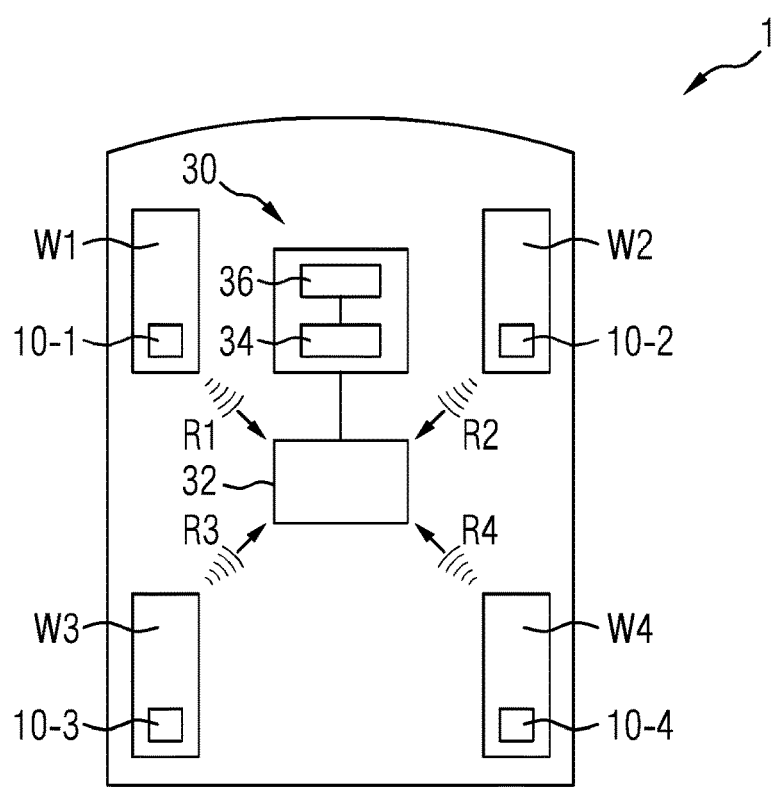

The invention will now be described in more detail by way of example embodiments with reference to the accompanying drawings, in which FIG. 1 illustrates a flowchart of a monitoring method according to an embodiment of the invention, FIG. 2 illustrates a tire in a rolling condition, which is equipped with an electronic tire unit performing the method of FIG. 1, FIG. 3 illustrates an example of a signal acquired by means of an acceleration sensor of the electronic tire unit in FIG. 2, in case of a dry road, FIG. 4 illustrates an example of a signal acquired by means of an acceleration sensor of the electronic tire unit in FIG. 2, in case of a wet road, FIG. 5 illustrates a block diagram of the electronic tire unit according to an embodiment, and FIG. 6 illustrates a vehicle comprising a plurality of tires each equipped with an electronic tire unit, according to an embodiment.

FIG. 1 illustrates the steps of a method for monitoring an instantaneous behavior of a tire of a vehicle in a rolling condition of the tire according to an embodiment of the invention.

A step S1 of continuously acquiring a signal representative of an acceleration of a specified point of the tire is performed in this embodiment.

Moreover, a step S2 of deriving from the signal a cyclic curve which represents a profile of the acceleration of the point during a revolution of the tire is performed.

Additionally, a step S3 of determining a leading portion and a trailing portion of the cyclic curve, corresponding to an entry of the point into a footprint region of the tire and corresponding to an exit of the point from the footprint region of the tire, respectively, is performed.

In a step S4, a first measure of a volatility of the signal in the leading portion and a second measure of a volatility of the signal in the trailing portion are determined.

In a step S5, a difference between the first measure and the second measure as an indication of the instantaneous behavior of the tire is determined.

FIG. 2 illustrates a wheel W of a vehicle, e.g. one of wheels W1 to W4 of a vehicle 1 illustrated in FIG. 6.

The wheel W comprises a rim and an air-filled tire 2 mounted on the rim.

FIG. 2 illustrates the wheel W in a rolling condition during a drive of the respective vehicle, wherein an arrow 3 indicates a rotation of the wheel W and consequently a rotation of the tire 2.

In this condition of the tire 2, a wheel load acting on the tire 2 causes a deformation of the tire 2 at the lower portion thereof, resulting in the formation of a footprint, i.e. an area at which the circumference of the tire 2 is flattened and is in contact with a road surface. FIG. 2 shows a length L of the footprint.

An electronic tire unit 10 is arranged at an inner side of a running surface of the tire 2.

Such electronic tire units may be part of tire pressure monitoring systems (TPMS) used in modern motor vehicles for monitoring the air pressure in the respective tires.

The electronic tire unit 10 is also used as such component for realizing a TPMS in the respective vehicle. To this end, the electronic tire unit 10 comprises a pressure sensor for acquiring a pressure signal representative of the air pressure in the tire 2, and an RF transmitter for sending RF signals R including information about the measured pressure to an RF receiver arranged at the vehicle.

FIG. 5 illustrates a block diagram of the electronic tire unit 10 according to an embodiment thereof.

FIG. 5 illustrates the pressure sensor 12 providing the pressure signal p, and a radial acceleration sensor 14 providing an acceleration signal "a" representative of the radial acceleration of the point of the tire 2, which is specified by the location at which the electronic tire unit 10 and thus the acceleration sensor 14 is arranged at the tire 2.

Both sensor signals p and "a" are input to a computing device comprising a processing unit 16 and a storing unit 18 coupled with the processing unit 16 and storing a software for operating the processing unit 16.

From time to time, the processing unit 16 creates a data telegram including operational parameters regarding the operation of the tire 2 (e.g. tire pressure) and causes an RF transmitter 20 to send the data telegram in the form of an RF signal R. To this end, the electronic tire unit 10 may also comprise further sensor devices (e.g. temperature sensor) not shown in FIG. 5 for incorporating further information (e.g. temperature) into the RF signals R.

FIG. 3 illustrates an example of the acceleration signal "a" (acquired in step S1) versus time t during one revolution (360°) of the tire 2 in case of rolling on a dry road.

Most of the time, the signal "a" takes a value "av" corresponding to a centrifugal acceleration of approximately 120 g (1 g=9.81 m/s$^2$) in the present example, caused by the rotation 3 of the tire 2 during the drive of the vehicle.

However, when the electronic tire unit 10 with the acceleration sensor 14 passes the footprint, the signal "a" shows a characteristic deviation from the value "av".

In the illustrated example of FIG. 3 the deviation can be found in a time span approximately from 34.52 s to 34.56 s. In this time span, the signal value firstly increases to a first maximum, then decreases to a minimum (where "a" approximately is zero), then increases again to a second maximum, and finally decreases again to the value "av".

FIG. 4 illustrates a diagram illustrating an example of the acceleration signal "a" versus time t of the same tire 2, when rolling on a wet road.

In this situation the course of the signal "a" as a function of the time t basically is the same as in the situation underlying the diagram of FIG. 3. However, in the situation according to FIG. 4, a leading portion of the tire 2 in the footprint region roles against a wedge of water, which is drained sideward in a middle portion of the tire 2 in the footprint region, so that there exists an asymmetry between the leading portion and the trailing portion of the tire 2 in the footprint region. The leading portion contacts (more) water, whereas the trailing portion contacts more or less directly the road surface.

In this situation, as can be seen from FIG. 4, the acceleration signal "a" shows relatively strong fluctuations in a time span reaching approximately from 15.90 s to 15.91 s corresponding to an entry of the electronic tire unit 10 into the footprint, whereas the signal "a" is relatively unaffected in a succeeding time span approximately reaching from 15.91 s to 15.92 s corresponding to an exit of the electronic tire unit 10 from the footprint region of the tire 2.

The situation of FIG. 4, characterized by relatively strong signal fluctuations in the leading portion, but nearly non fluctuations in the trailing portion, is a situation bearing the danger of aquaplaning, which would e.g. start when the velocity of the vehicle will be somewhat increased.

Therefore, in this situation, it is of advantage to provide an aquaplaning warning, e.g. for warning the driver of the vehicle.

The electronic tire unit 10 illustrated in FIG. 5 is a device for monitoring the instantaneous behavior of the tire 2 of the respective vehicle in a rolling condition of the tire 2 by conducting a monitoring method comprising the steps S1 to S5 as already described with reference to FIG. 1.

Hereinafter, these steps S1 to S5 are explained again with reference to the examples according to FIGS. 3 and 4 (and the wheel arrangement illustrated in FIG. 2).

In step S1, the acceleration sensor 14 of the electronic tire unit 10 continuously acquires the signal "a" representative of the radial acceleration of the point of the tire 2, at which the electronic tire unit 10 is arranged (e.g. fixed at the inner side of the running surface of the tire 2). With each revolution of the tire 2, a course of the signal "a" as a function of the time t is acquired as depicted by way of example in FIG. 2 and FIG. 3, respectively.

In step S2, the processing unit 16 of the electronic tire unit 10 derives from the signal "a" a cyclic curve (not shown in FIGS. 2 and 3), which represents a profile of the acceleration as a function of the time t. This is done e.g. by smoothing the curves depicted in FIG. 2 and FIG. 3, respectively, e.g. by calculating a moving average of the acquired signal values. In an embodiment, the "averaging time span" is determined depending on the time required for the tire 2 to complete one revolution (360°), e.g. as a fixed ratio (e.g. in the range of 0.05% to 10%) of the time required to complete one complete revolution (360°).

In an embodiment, preferably before such smoothing is conducted, outliers (i.e. obviously false values of "a") are eliminated from the set of acquired data points. Such outliers can be seen for example in FIG. 3 at t=34.57 s, and in FIG. 4 at t=15.885 s.

In an embodiment, the derivation of a cyclic curve is based on signal values of the signal "a" acquired over a timespan corresponding to more than one revolution of the tire 2, e.g. two revolutions or three revolutions. With this embodiment, the statistical quality of the derived cyclic curve can be advantageously increased.

Alternatively or in addition to the mentioned smoothing, in step S2 a fit (mathematical regression) of the cyclic curve may also be used.

In step S3, the processing unit 16 determines a leading portion and a trailing portion of the cyclic curve by use of a suitable algorithm providing start and endpoints of such leading portion and trailing portion.

With respect to the signal "a" illustrated in FIG. 3, such algorithm may determine a leading portion e.g. as the range from 34.530 s to 34.535 s and a trailing portion e.g. as the range from 34.540 s to 34.545 s. In this example, start and end points of the leading and trailing portions are chosen within respective rising and falling edges of the cyclic curve. However, in general, such start and end points may be chosen in any other suitable manner. In particular, in an embodiment of the invention, it is also possible to determine the leading and trailing portions such that the end point of the leading portion simultaneously constitutes the start point of the trailing portion.

In step S4, the processing unit 16 determines a first measure of a volatility of the signal "a" in the leading portion (as determined in step S3) and a second measure of a volatility of the signal "a" in the trailing portion (as determined in step S3).

In the illustrated embodiment, each of these measures of the volatility is determined based on an evaluation of RMS (root mean square) noise of the signal "a", resulting in a first volatility parameter for the leading portion and a second volatility parameter for the trailing portion. In this embodiment, each volatility parameter specifies the deviation of the actually acquired signal values (curve in FIG. 2 and FIG. 3, respectively) from the respective cyclic curve (as determined in step S2).

In deviation from the described embodiment using only an evaluation of RMS noise for determining volatility parameters as the first and second measures, the determining of volatility parameters may comprise also a counting of how often the signal "a" rises above a predetermined threshold and/or falls below a predetermined threshold within the leading and trailing portions.

In an embodiment, the determination of the volatility parameter in step S4 is accomplished by determining a volatility parameter for each revolution (360°) of the tire 2, but providing a smoothed volatility parameter to be outputted to step S5, e.g. by averaging over more than one revolution of the tire 2, e.g. two or three revolutions.

In step S5, the processing unit 16 determines a difference between the first volatility parameter and the second volatility parameter as an indication of the instantaneous behavior of the tire 2.

It is apparent from a comparison of FIG. 3 (for "dry road") with FIG. 4 (for "wet road"), that such a difference in the case of FIG. 2 will be small, because the first and second volatility parameters both are relatively small, and that such a difference will be significantly increased in the case of FIG. 4, because the first volatility parameter (for the leading portion) is relatively high and the second volatility parameter (for the trailing portion) is relatively small.

In the shown embodiment, step S5 is accomplished simply by a mathematical subtraction of the first volatility parameter from the second volatility parameter (or vice versa).

Referring to FIG. 4, an alternative way to determine said first and second volatility parameters can involve a counting of how often the signal "a" crosses a line (representing a predetermined threshold acceleration value). Such a line may be defined by an intermediate acceleration value lying between a minimum value of the signal "a" (typically approx. zero) and the already mentioned value "av". For example, when choosing such intermediate value in the middle between the minimum (a=0) and av (approx. 120 g), i.e. approx. 60 g, it is apparent from FIG. 4 that such threshold line is relatively often crossed within the leading portion, whereas such crossing takes not often place within the trailing portion. Therefore also a counted number of such crossings (rising above and/or falling below) may be used for determining suitable volatility parameter).

In the present embodiment of the electronic tire unit 10 (FIG. 5), an information about the result of step S5 is transferred from the electronic tire unit 10 to an electronic control unit 30 of the respective vehicle. To this end, the processing unit 16 incorporates such information (e.g. values of the difference between first and second volatility parameters) in the RF signals R, which are transmitted by means of the RF transmitter 20 of the electronic tire unit 10.

In an alternative embodiment, the electronic tire unit 10 determines whether the difference determined in step S5 fulfils a predetermined warning criterion (e.g. aquaplaning warning criterion), and as the case may be generates a corresponding warning and incorporates this warning in the information to be sent by the RF transmitter 20.

FIG. 6 illustrates an example of a vehicle 1 having four wheels W1 to W4 each comprising a tire equipped with an electronic tire unit 10-1 to 10-4.

In this example it is assumed that each of the electronic tire units 10-1 to 10-4 is designed as the electronic tire unit 10, which has already been described with reference to FIG. 5.

In FIG. 6, the RF signals (cf. signal R in FIGS. 2 and 5) sent by the individual units 10-1 to 10-4 are designated by the reference signs R1 to R4.

The vehicle 1 has an electronic control unit 30 comprising a software-controlled processing unit 34 and a storing unit 36 coupled with the processing unit 34 and storing a software code by which the operation of the processing unit 34 is controlled.

The electronic control unit 30 is coupled with an RF receiver 32 for receiving the RF signals R1 to R4 from the units 10-1 to 10-4.

In this embodiment, the processing unit 34 conducts an evaluation of the received indications of the instantaneous behavior of the tires at the wheels W1 to W4.

Based on a result of this evaluation, which may comprise e.g. a determination whether the transmitted differences (determined in step S5) fulfil a predetermined criterion, the processing unit 34 causes an outputting of a warning (e.g. aquaplaning warning) to the driver of the vehicle 1.

A respective warning algorithm conducted by the processing unit 34 may provide that such warning is outputted only if more than one of the differences transmitted by the units 10-1 to 10-4 fulfils a predetermined warning criterion (e.g. when at least two of the units 10-1 to 10-4, or at least two of the units 10-1 to 10-4 arranged at a same axle of the vehicle 1, transmit differences fulfilling the criterion).

Alternatively, such algorithm e.g. may provide that such warning will be outputted if at least one of the differences transmitted from the units 10-1 to 10-4 fulfils a predetermined warning criterion.

LIST OF REFERENCE SIGNS 1 vehicle
2 tire
3 rotation
W1 to W4 vehicle wheels
L length of footprint
10-1 to 10-4 electronic tire units
R1 to R4 RF signals
12 pressure sensor
p pressure signal
14 acceleration sensor
a acceleration signal
16 processing unit
18 storing unit
20 RF transmitter
30 electronic control unit
32 RF receiver
34 processing unit
36 storing unit

The invention claimed is:

1. A method for monitoring a behavior of a tire of a vehicle in a rolling condition of the tire, comprising the steps of:
   a) acquiring a signal representative of an acceleration of a specified point of the tire,
   b) deriving from the signal a curve which represents a profile of the acceleration of the point during a revolution of the tire,
   c) determining a leading portion and a trailing portion of the curve, corresponding to an entry of the point into a footprint region of the tire and corresponding to an exit of the point from the footprint region of the tire, respectively, d) determining a first measure of a volatility of the signal in the leading portion and a second measure of volatility of the signal in the trailing portion, e) determining an indication of the behavior of the tire based on the first measure and the second measure.

2. The method according to claim 1, wherein step e) comprises determining an aquaplaning condition of the tire based on the first measure and the second measure.

3. The method according to claim 1, wherein step a) is realized by means of an electronic tire unit which is arranged at the tire.

4. The method according to claim 1, wherein the first measure and the second measure each are determined based on an evaluation of RMS noise of the signal.

5. The method according to claim 1, wherein step e) comprises determining a difference between the first measure and the second measure.

6. The method according to claim 1, wherein step e) comprises determining a total amount of the first measure and the second measure.

7. The method according to claim 1, wherein step e) comprises determining a type of a road the vehicle is driving on.

8. A non-transitory computer readable medium containing software code for performing the method of claim 1 when the software code is run on a computer.

9. The method according to claim 1, further comprising a step of outputting a warning if the determined indication of behavior of the tire fulfils a predetermined warning criterion.

10. The method according to claim 9, wherein the step of outputting the warning comprises outputting an aquaplaning warning.

11. A device for monitoring a behavior of a tire of a vehicle in a rolling condition of the tire, comprising:

acquiring means for acquiring a signal representative of an acceleration of a specified point of the tire, deriving means for deriving from the signal a curve which represents a profile of the acceleration of the point during a revolution of the tire, first determining means for determining a leading portion and a trailing portion of the curve, corresponding to an entry of the point into a footprint region of the tire and corresponding to an exit of the point from the footprint region of the tire, respectively, second determining means for determining a first measure of volatility of the signal in the leading portion and a second measure of volatility of the signal in the trailing portion, third determining means for determining an indication of the behavior of the tire based on the first measure and the second measure.

12. The device according to claim 11, further comprising outputting means for outputting a warning if the determined indication of behavior of the tire fulfils a predetermined warning criterion.

13. The device according to claim 11, wherein the third determining means are further configured for determining a type of a road the vehicle is driving on.

14. The device according to claim 11, wherein the acquiring means are provided by an acceleration sensor or a shocksensor of an electronic tire unit arranged at the tire.

15. The device according to claim 14, wherein the deriving means and the first, second and third determining means are provided by a computing device of the electronic tire unit or a computing device of an electronic control unit of the vehicle.

\* \* \* \* \*